March 31, 1970  J. G. CADIOU  3,503,634
MULTIPLE COUPLING FOR FLUID CONDUITS
Original Filed March 13, 1967  3 Sheets-Sheet 1

Jean Georges Cadiou,
Inventor

By Wenderoth, Lind and Ponack,
Attorneys

March 31, 1970 J. G. CADIOU 3,503,634
MULTIPLE COUPLING FOR FLUID CONDUITS
Original Filed March 13, 1967 3 Sheets-Sheet 2
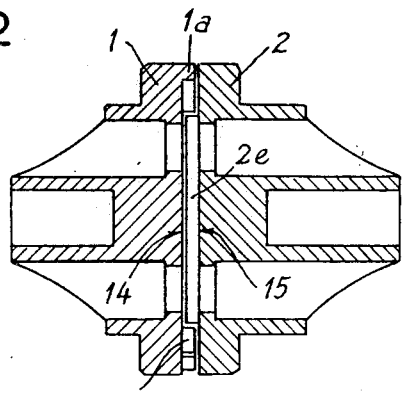
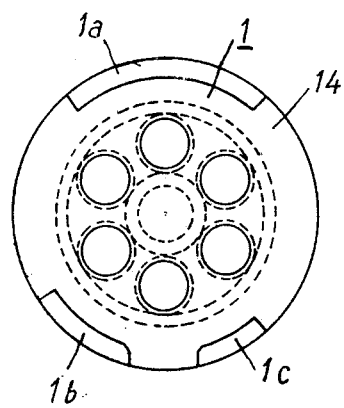
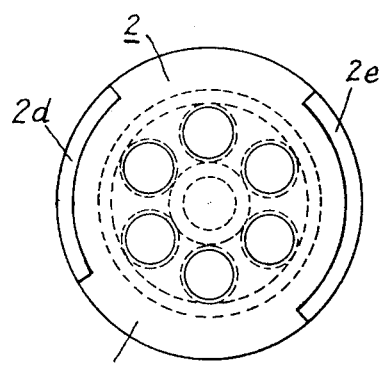
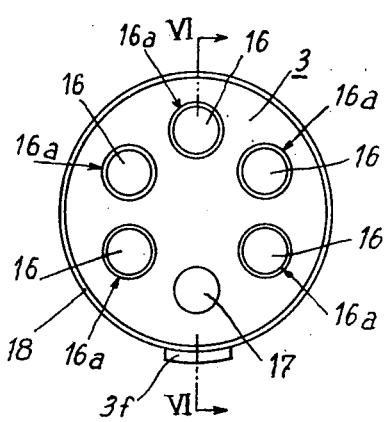
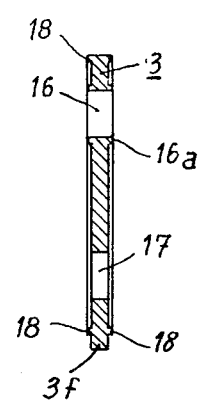

March 31, 1970 J. G. CADIOU 3,503,634
MULTIPLE COUPLING FOR FLUID CONDUITS
Original Filed March 13, 1967 3 Sheets-Sheet 3
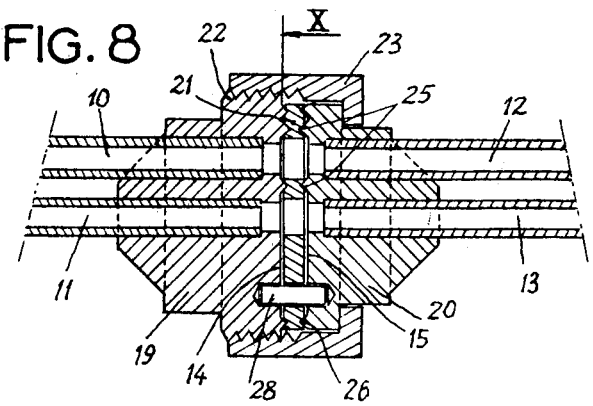
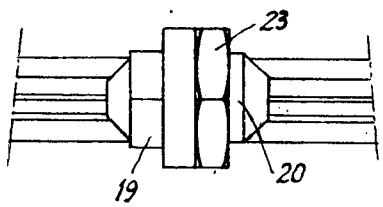
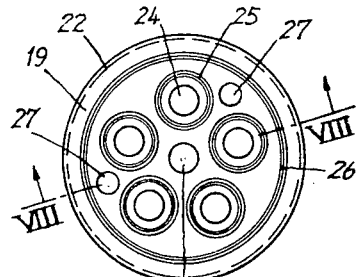
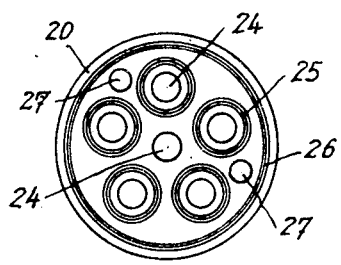
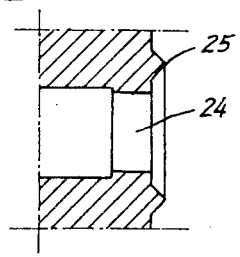
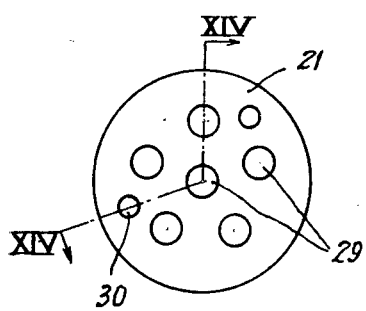
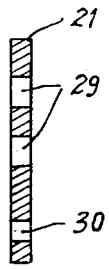
Jean Georges Cadiou,
Inventor
By Wenderoth, Lind & Ponack
Attorneys

United States Patent Office 3,503,634
Patented Mar. 31, 1970

1

3,503,634
MULTIPLE COUPLING FOR FLUID CONDUITS
Jean Georges Cadiou, Paris, France, assignor to Societe Anonyme Andre Citroen, Paris, France, a corporation of France
Continuation of application Ser. No. 622,630, Mar. 13, 1967. This application May 19, 1969, Ser. No. 828,425
Claims priority, application France, Mar. 24, 1966, 54,869; Feb. 16, 1967, 95,263
Int. Cl. F16i 39/00, 17/06, 15/08
U.S. Cl. 285—137                          1 Claim

ABSTRACT OF THE DISCLOSURE

A coupling for joining together and assembling bundles of tubes of any desired number, in which two endpieces fixable to the extremities of the tubes of a bundle are provided with projections and are associated with a fluid-tight sealing joint, the joint and the endpieces being adapted to cooperate only in one single position during the assembly of the coupling by means of appropriate clamping devices.

---

This application is a continuation of application Ser. No. 622,630 filed Mar. 13, 1967, and now abandoned.

The invention relates to multiple couplings for fluid conduits and more especially for tube bundles of hydraulic and pneumatic devices.

In present day hydraulic or pneumatic control devices, often composed of a number of members, the arrangement of the coupling tubes presents problems similar to those met with in the layout of electric circuits comprising a large number of wires. It can be seen in fact that it is useful to constitute nests of tubes of small bulk, easy to couple together and which can be coupled or separated without error in a single operation, like bundles of electric wires connected to a socket and a plug with a large number of pins.

The present invention makes it possible to provide for these problems an economic solution having a minimum overall size.

The invention has for its object a coupling intended for the junction and the assembly of bundles of tubes of any number, characterized essentially by the combination with a fluid-tight joint of two endpieces which can be fixed to the extremities of the tubes of a bundle and having projections which extend or do not extend the joint, this latter and the endpieces being only able to cooperate in one single manner during the assembly of the coupling by means of appropriate clamping members.

Figure 1:
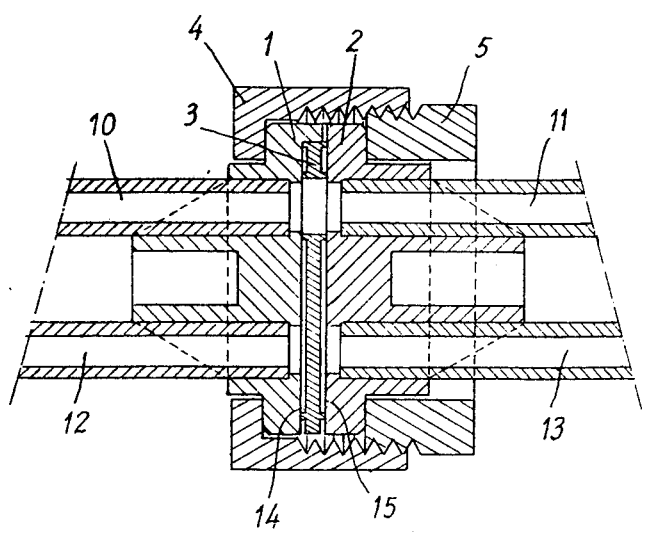
Figure 7:
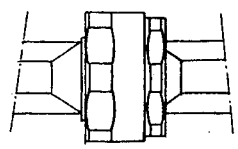

The invention will however be better understood by means of the description which follows below of two forms of embodiment taken as examples and illustrated in the accompanying drawings, in which:

FIG. 1 shows one form of embodiment in longitudinal section.
FIG. 2 shows the two endpieces after assembly.
FIG. 3 is a front view of one of these endpieces.
FIG. 4 is a front view, similar to that of FIG. 3, of the other endpiece.
FIG. 5 shows the coupling gasket of FIG. 1 seen in plan view.
FIG. 6 is a view in cross section taken along the line VI—VI of FIG. 5.
FIG. 7 is an external view of the device shown in FIG. 1.
FIG. 8 represents a longitudinal section of an alternative form of construction of the coupling, taken along the line VIII—VIII of FIG. 10.
FIG. 9 shows an external view of the assembly of FIG. 8.

2

FIG. 10 is a front view of one of the endpieces of the coupling shown in FIG. 8.
FIG. 11 is a front view of the other endpiece.
FIG. 12 shows the detail of the fluid-tight sealing lips of the endpiece.
FIG. 13 is a plan view of the gasket of FIG. 8.
FIG. 14 is a cross section of this gasket taken along the line XIV—XIV of FIG. 13.

Referring now to FIG. 1 of the drawings, it can be seen that a coupling according to the invention comprises two endpieces 1 and 2 fixable by a suitable method such as brazing, welding or sticking, to the extremities of the conduits 10 and 11, 12 and 13, of metal or similar material, respectively conveying fluids under pressure and fluids without pressure, drainage or return fluids, for example. On their free faces 14 and 15, the endpieces 1 and 2 are provided with projections of arcuate segment shape 1a, 1b, 1c and 2d, 2e (FIGS. 2, 3 and 4), which cooperate with each other in such manner as to define a single assembly position of the endpieces, and are clamped together by means of male and female sockets 5 and 4, respectively provided with an external thread and an internal thread.

In order to ensure fluid-tightness of the coupling according to the invention, there is inserted between the faces 14 and 15 of the end-pieces, a gasket 3 of soft metal, aluminium, zinc or lead for example, of reinforced or nonreinforced plastic material, etc.

This gasket 3 is pierced with holes 16 and 17 (FIGS. 5 and 6) which put into communication the conduits 10 and 11, 12 and 13, when there is inserted, between the projections 1b and 1c of the endpiece 1, a tongue 3f which extends the gasket. Narrow flanges 16a and 18 border the edges of the holes 16 and of this gasket 3 on each face, in the manner described in French Patent No. 1,168,592 of Feb. 15, 1957, by the present applicants.

It should be observed that the endpieces 1 and 2 are advantageously made of sintered material, which eliminates all machining, in spite of their relative complexity. These endpieces may then be brazed and lose their porosity during the course of this operation by becoming impregnated with the brazing material.

In an alternative form of construction of a coupling according to FIGS. 8 to 11, the coupling comprises two endpieces 19 and 20 fixable to the extremities of the conduits 10 and 11, 12 and 13.

In order to ensure fluid-tightness of this coupling, there is inserted between the faces 14 and 15 of the endpieces a flat gasket 21 of soft metal, of plastic material reinforced or not, or of any other appropriate material.

The endpiece 19 is provided at its external periphery with a threaded portion 22 playing the part of a male piece of a clamping coupling, of which the tapped female socket 23 is mounted on the endpiece 20 and is screwed over the threaded portion 22.

The endpieces 19 and 20 are provided with orifices 24 for the inlet of the conduit tubes, distributed over a circumference and at the centre. Annular sealing lips 25 surround the extremities of the orifices 24 to the exclusion of that of the centre.

Another annular lip 26, close to the outer periphery, surrounds the whole of the orifices and ensures the fluid-tightness of the complete coupling, together with that of the central conduit.

The endpieces 19 and 20 can advantageously be made of sintered material, and the conduits may be assembled by brazing.

FIG. 12 shows in detail the shape of a lip 25 which surrounds the orifice 24 and has a triangular section, for example. When the socket 23 is tightened-up, the lips 25 are pushed into the joint 21 and ensure the fluid-tightness of the coupling.

Each endpiece is also provided with at least two eccentric blind holes 27 which face those of the other.

Centering feet 28 are fixed in the holes to position the two endpieces and only permit a single position of assembly.

As indicated in FIGS. 13 and 14, the flat joint 21 is also provided with orifices 29 for the passage of the fluid and 30 for the positioning with respect to the endpieces.

It will of course be understood that the forms of embodiment described above have no limitative character and may be given any necessary modifications without thereby departing from the scope of the invention.

I claim:

1. A coupling for joining together and assembling of bundles of fluid conveying tubes of predetermined number and size, comprising two endpieces having orifices for the inlet of said tubes fixable each on the extremities of the tubes of a bundle, a one piece circular gasket of soft malleable material inserted between said endpieces and having holes cooperating with said orifices, and socket type clamping members having male and female threaded members surrounding and engaging said end-pieces for assembling them by only one manoeuver, wherein said gasket has on each face independent narrow annular flanges bordering the periphery of said gasket and said holes, said gasket being provided with a radially extending tongue, and said endpieces being provided on their face opposite to said gasket with cooperating axially extending projections having the shape of arcuate segments so that said endpieces and said gasket cooperate in only one relative angular position, said gasket tongue being inserted in that position between two projections of one endpiece.

References Cited

UNITED STATES PATENTS

| 2,200,688 | 5/1940 | Bridgers | 277—11 |
| 2,438,679 | 3/1948 | Parker | 285—137 |
| 2,510,125 | 6/1950 | Meakin | 285—137 X |
| 2,649,742 | 8/1953 | Armstrong | 285—137 X |
| 3,096,135 | 7/1963 | Feustel et al. | 339—186 |
| 3,301,578 | 1/1967 | Platt et al. | 285—331 |
| 3,305,249 | 2/1967 | Zahuranec | 285—137 |
| 3,345,086 | 10/1967 | Wallace | 285—137 X |

FOREIGN PATENTS

| 647,103 | 8/1962 | Canada. |
| 773,671 | 9/1934 | France. |
| 13,484 | 1898 | Great Britain. |
| 47,795 | 9/1918 | Sweden. |

THOMAS F. CALLAGHAN, Primary Examiner

U.S. Cl. X.R.

277—11, 211, 236; 285—330, 353